United States Patent
Igaki et al.

(10) Patent No.: US 7,019,281 B2
(45) Date of Patent: Mar. 28, 2006

(54) ROTATION ANGLE DETECTION APPARATUS AND ROTARY DISK FOR SAME

(75) Inventors: Masahiko Igaki, Kanagawa (JP); Akio Atsuta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 10/641,197

(22) Filed: Aug. 13, 2003

(65) Prior Publication Data

US 2004/0031914 A1    Feb. 19, 2004

(30) Foreign Application Priority Data

Aug. 13, 2002   (JP)   ............................. 2002-235543

(51) Int. Cl.
*G01D 5/34*    (2006.01)
(52) U.S. Cl. .................. 250/231.13; 250/238; 356/614; 33/1 PT
(58) Field of Classification Search ........... 250/231.13, 250/231.14, 213.18, 238; 356/614–618; 341/13; 33/1 PT
See application file for complete search history.

(56) References Cited

U.S. PATENT DOCUMENTS 5,017,776 A  *  5/1991  Loewen .................. 250/231.14

FOREIGN PATENT DOCUMENTS

| JP | 60-140119 | 7/1985 |
| JP | 62-3617 | 1/1987 |
| JP | 5-39410 | 2/1993 |
| JP | 5-39411 | 2/1993 |
| JP | 6-302032 | 10/1994 |
| JP | 2810521 | 7/1998 |
| JP | 2862417 | 12/1998 |

OTHER PUBLICATIONS

English Abstract for Japanese Patent Application Laid-Open No. 5-240613 (from which Japanese Patent Publication No. 2862417 issued, which is listed as item "A").
English Abstract for Japanese Patent Application Laid-Open No. 4-130221 (from which Japanese Patent Publication No. 2810521 issued, which is listed as item "B").

* cited by examiner

*Primary Examiner*—Stephone B. Allen
*Assistant Examiner*—Patrick J. Lee
(74) *Attorney, Agent, or Firm*—Morgan & Finnegan, L.L.P.

(57) ABSTRACT

A rotation information record surface of a rotary disk is disposed at an intermediate position between a fixing point of the rotary disk and a rotary shaft and a fixing position of a detection head, so that a stable gap can be obtained with a variation due to thermal expansion being reduced. In order to attain this, the fitting portion of the rotary disk is shaped to have a first fitting portion and a second fitting portion. The first fitting portion is provided for attaining satisfactory coaxiality, and the second fitting portion is adapted to form a clearance into which bonding means such as an adhesive is to be infused. With the above structure, an optimum detection position (i.e. an optimum gap position) would not be varied by a change in the ambient temperature.

2 Claims, 10 Drawing Sheets

ROTATION ANGLE DETECTION APPARATUS AND ROTARY DISK FOR SAME

BACKGROUND OF THE INVENTION

1. Field of the Invention

The present invention relates to a rotation angle detection apparatus and particularly relates to an apparatus, such as a resin rotary encoder, provided with a rotary disk. The invention also relates to a rotary disk used in such an apparatus.

2. Related Background Art

Many of the conventional rotary encoders are optical rotary encoders that detect rotation angle information optically or magnetic rotary encoders that detect rotation angle information magnetically. The optical rotary encoder is either a transmissive rotary encoder in which a light flux is adapted to be transmitted by a rotation angle information record part or a reflective rotary encoder in which a light flux is adapted to be reflected by a rotation angle information record part.

Figure 11:
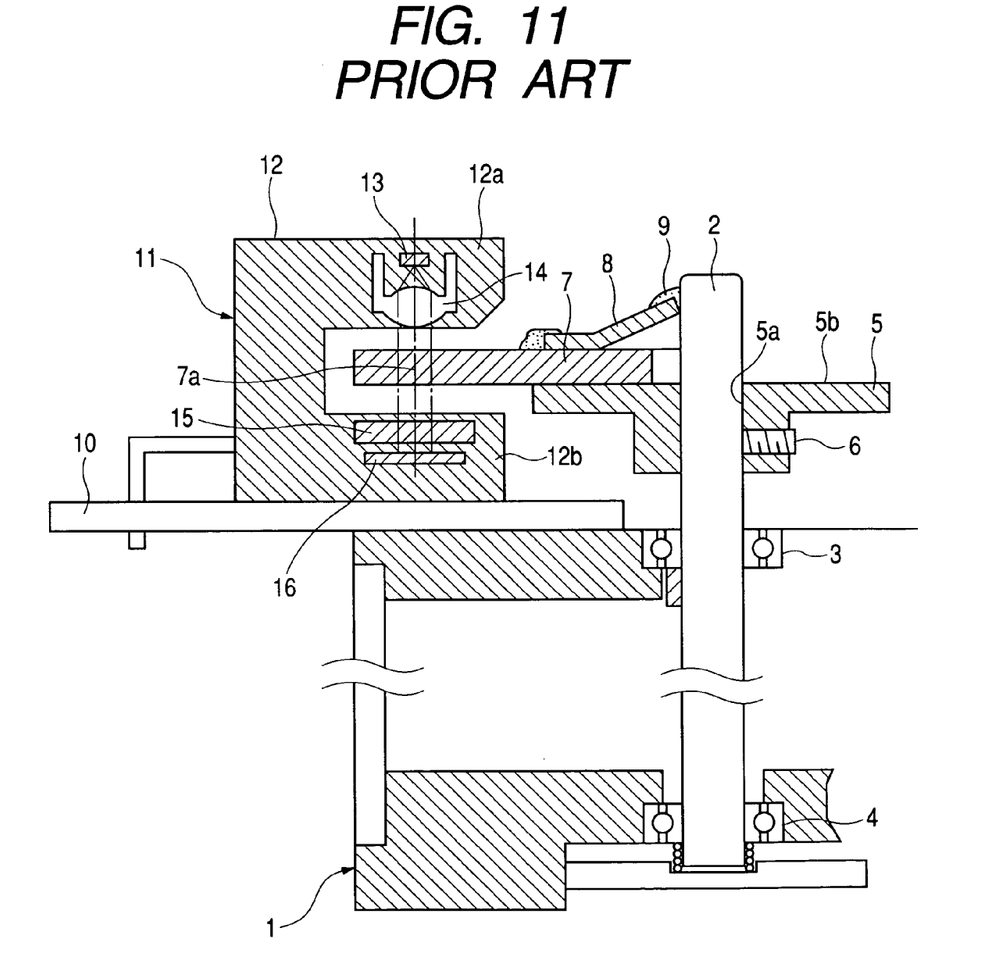
FIG. 11 is a partial cross sectional view showing a conventional transmissive encoder.

FIG. 11 shows, by way of example, a conventional transmissive rotary encoder. In this rotary encoder, a motor 1 supports a rotary shaft 2 by bearings 3 and 4. An attachment hub 5 made of a metal is fitted to the upper portion of the rotary shaft 2 and secured to the rotary shaft 2 by a set screw 6.

A rotary scale 7 serving as a rotation angle record part is mounted on the top surface of the attachment hub 5. The rotary scale 7 is secured to the attachment hub 5 by means of a setting ring 8 and adhesive 9 fixed to the rotary shaft 2. On the top surface of the motor 1, there is provided a transmissive type sensor head 11 with an electric circuit board 10 between.

The sensor head 11 has a frame 12 provided on the electric circuit board 10. The peripheral portion of the rotary scale 7 is disposed between an upper frame portion 12a and a lower frame portion 12b of the frame 12 in such a way that the peripheral portion of the rotary scale 7 is not brought into contact with the upper and lower frame portions 12a and 12b. The upper frame portion 12a of the frame 12 accommodates a light emitting element 13 and a collimator lens 14 arranged in the mentioned order from top down, while the lower frame portion 12b of the frame 12 accommodates a fixed scale 15 and a light receiving element 16 arranged in the mentioned order from top down.

The attachment hub 5 is made of a material having good machinability such as brass or aluminum. The inner surface of a fitting hole 5a to which the rotary shaft 2 is to be fitted and a supporting surface 5b on which the rotary scale is to be mounted are machined with high precision. The rotary scale 7 is made of a thin glass plate or a thin metal plate, and etching is applied to it or a PET film for photoengraving is attached to it.

Figure 12:
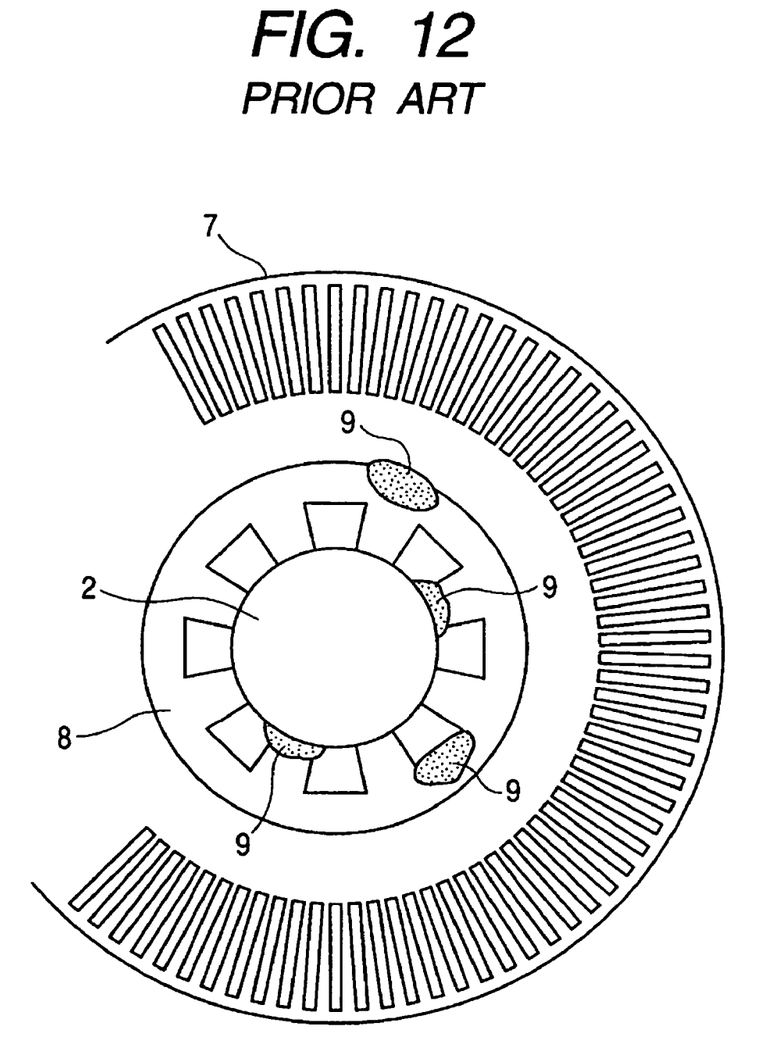
FIG. 12 is a enlarged plan view showing a part of the conventional encoder.

Upon assembling the rotary encoder, the attachment hub 5 is fitted to the rotary shaft 2 of the motor 1 and the attachment hub is positioned to a predetermined thrust height position, and then the set screw 6 is tightened. Next, the rotary scale 7 is placed on the top surface of the attachment hub 5, and then the rotary scale 7 is provisionally secure by a setting ring 8 attached to the rotary shaft 2. Then, adjustment for aligning the center of a recorded pattern of the rotation angle information record part 7a of the rotary scale 7 and the center of the rotary shaft 2 is performed. After that, the rotary shaft 2 and the setting ring 8 are fixed to each other by the adhesive 9, and the rotary scale 7 and the setting ring 8 are also fixed to each other by the adhesive 9, as shown in FIG. 12. Finally, the sensor head 11 is brought to the vicinity of the rotary scale 7 in such a way that the outer periphery of the rotary scale 7 is inserted between the upper frame portion 12a and the lower frame portion 12b of the frame 12, and the sensor head 11 is secured at an appropriate position in relation to the motor 1.

A divergent light flux emitted from the light emitting element 13 of the sensor head 11 is transmitted through the collimator lens 14 so as to be converted into a substantially parallel light flux. This light flux passes through the rotation angle information record part 7a of the rotary scale 7 and then passes through the fixed scale 15 to enter the light receiving element 16. The sensor head 11 optically reads a change in moiré fringes caused by a change in relative angular positional relationship between the rotation angle information record part 7a and the fixed scale 15 in terms of a change in the quantity of light incident on the light receiving element 16 to detect the rotation angle of the rotary scale 7.

Figure 13:
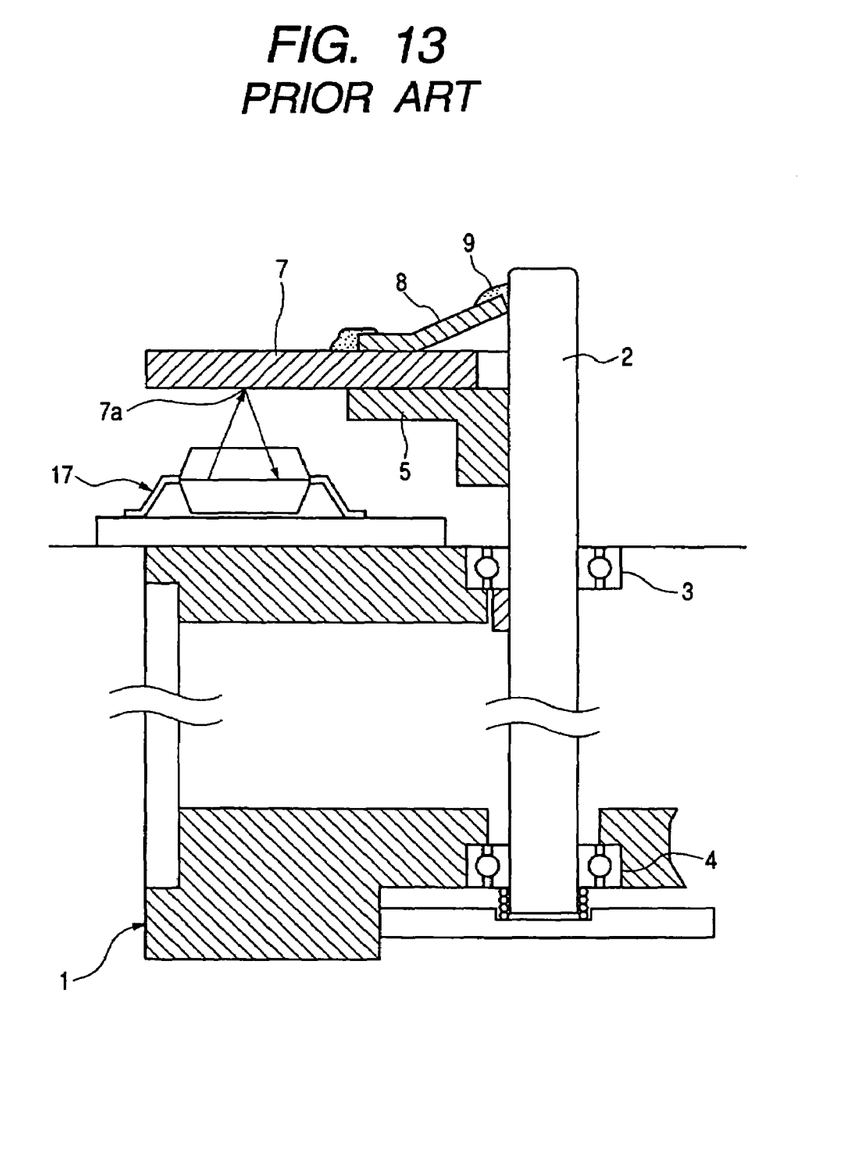
FIG. 13 is a partial cross sectional view showing a conventional reflective encoder.

FIG. 13 shows a conventional reflective rotary encoder. This reflective rotary encoder has instead of the above-described sensor head 11 a sensor head 17 disposed beneath the rotary scale 7 for detecting a reflected light flux from a rotary angle information record part 7a of a rotary scale 7.

As will be understood from the above, manufacturing of a conventional rotary encoder involves many parts such as an attachment hub 5, a set screw 6, a setting ring 8 and adhesive 9. In addition, the adhesive 9 is applied to many portions, and a centering process is required to be performed. Thus, manufacturing of a conventional rotary encoder involves many processes and it is difficult to reduce the manufacturing cost. In addition, since the rotary scale 7 is formed on a thin glass plate or a thin metal plate by etching or as a photoengraving PET film attached thereto, it is impossible to attain a high degree of precision in coaxiality or in fitness.

Recently, it has been known in the field of rotary encoder production, to mold an attachment hub 5 and a rotary scale 7 integrally with a synthetic resin material and to mount the molded part in the form of a rotary disk to a rotation shaft 2 easily so as to reduce the manufacturing cost. For example, the applicant of this application has disclosed a rotary scale having a V-grooved grating in, for example, Japanese Patent Application Laid-Open No. 60-140119, Japanese Patent Application Laid-Open No. 62-3617, Japanese Utility Model Application Laid-Open No. 5-84818, Japanese Patent Application Laid-Open Nos. 5-39410 and 5-39411 and proposed a rotary scale having a cylindrical grating in for example Japanese Patent publication Nos. 2810521 and 2862417.

Figure 14:
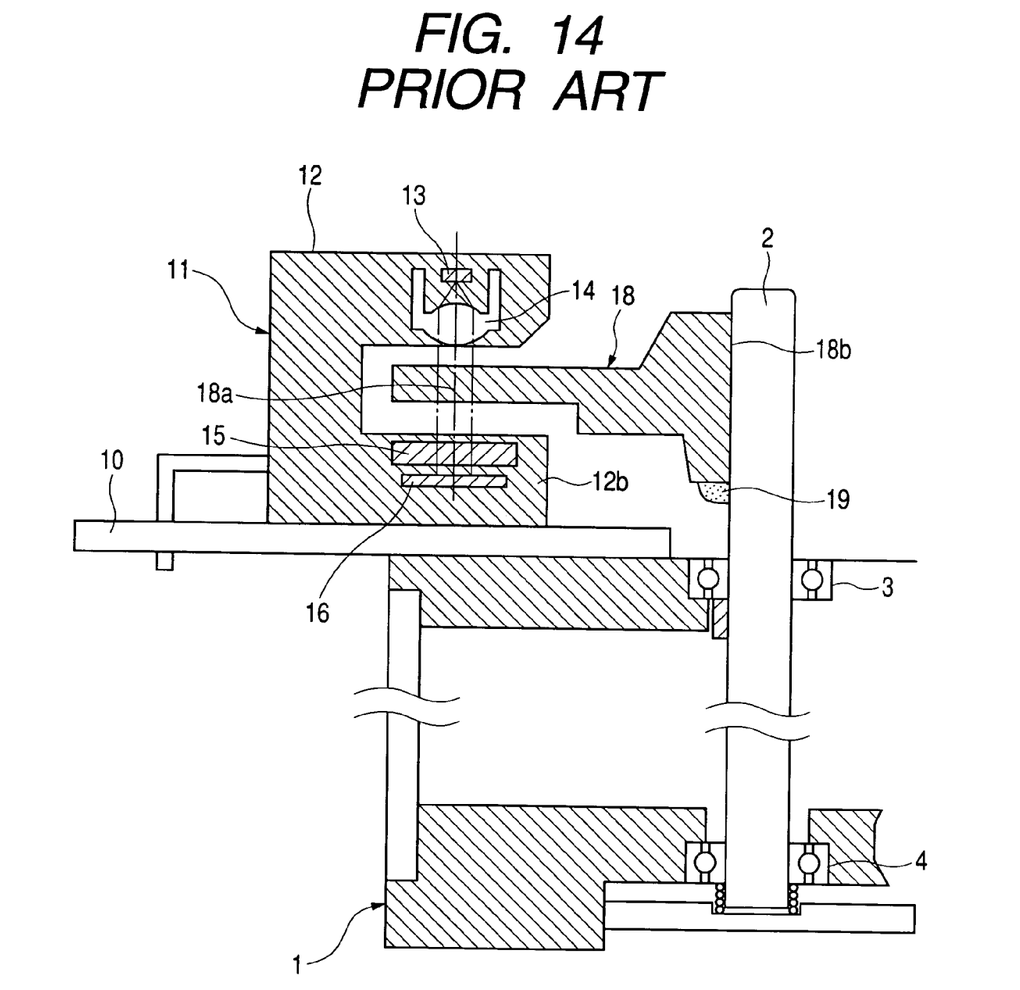
FIG. 14 is a partial cross sectional view showing a conventional transmissive encoder having an integral rotary disk

FIG. 14 shows a rotary encoder provided with a rotary disk 18 that has been integrally molded using a synthetic resin material. The rotary disk 18 is provided with an rotation angle information record part 18a. The rotary disk 18 is fitted to a rotary shaft 2 of a motor 1 that is similar to those described above, and the rotary shaft 2 and the rotary disk 18 are bonded by adhesive 19.

In this rotary encoder, the above-described attachment hub 5, the set screw 6, the setting ring 8 are not necessary. In addition, it is easy to attain required degree of precision in fitness of the rotary shaft 2 with the fitting hole 18b of the rotary disk 18 and in the coaxiality of the pattern of the rotation angle information record part 18a and the fitting hole 18b of the rotary disk 18. Furthermore, the above-mentioned centering process, which is the most troublesome process, can be omitted. Therefore, the manufacturing cost would be greatly reduced by virtue of the reduction of the number of the parts and the omission of the centering process.

However, in the case in which the rotary shaft 2 is made of a metal and the rotary disk 18 is made of a synthetic resin, when the ambient temperature greatly changes, the size of the rotary shaft 2 and the size of the rotary disk 18 will change in accordance with their respective thermal expansion coefficients, so that the relative position of the rotary shaft 2 and the rotary disk 18 will change, since the thermal expansion coefficient of a synthetic resin material is larger than the thermal expansion coefficient of a metal or a glass. Similarly, in the case in which the sensor head 11 is made of a synthetic resin, the sensor head can deviate from its optimum position due to its proper thermal characteristic coefficient.

Especially, when the dimensions of the rotary disk 18 and the sensor head 11 change with respect to the thrust direction of the rotary shaft 2, the optimum spacing between the rotation angle information record part 18a and the sensor head varies, so that the output signal of the sensor head also varies. Thus, the detection accuracy of the sensor head would be deteriorated. In the worst case, the rotary disk 18 and the sensor head 11 collide physically with each other to cause a damage.

In order to solve the above-described problem, it is necessary to reduce the mounting tolerance of the rotary disk 18 to the sensor head 11 with respect to the thrust direction as small as possible, which involves an increase in the manufacturing cost.

SUMMARY OF THE INVENTION

An object of the present invention is to solve the above-described problem to provide a rotation angle detection apparatus that can detect the rotation angle with high accuracy while coping with a change in the ambient temperature with a low cost structure. It is also an object of the present invention to provide a rotary disk of that apparatus.

In order to attain the above object, an rotation angle detection apparatus according to the present invention comprises a rotating element(s) such as a motor, a gear(s) and/or a pulley(s), a rotary disk made of a synthetic resin fixed to a rotary shaft of the rotating element and a sensor head for detecting information based on a rotation angle information record part provided on the rotary disk, wherein the surface of the rotation angle information record part of the rotary disk is disposed between the position of a bonding point of the rotary shaft and the rotary disk with respect to the thrust direction and the position of a bonding point of a sensor head mounting portion with respect to the thrust direction.

A rotary disk for use in a rotation angle detection apparatus according to the present invention is made of a synthetic resin material and comprising a fixing portion to be fixed to a rotary shaft of a rotation angle detection apparatus, a cylindrical portion extending from an outer peripheral portion of the fixing portion in a direction along an axis of the rotary shaft and a disk body portion extending from an end portion of the cylindrical portion in a direction perpendicular to the axis of said rotary shaft.

Other objects and features of the present invention will become apparent from the following descriptions of the embodiments of the present invention.

DETAILED DESCRIPTION OF THE PREFERRED EMBODIMENTS

In the following, the present invention will be specifically described with reference to embodiments of the invention shown in FIGS. 1 to 10.

Figure 1:
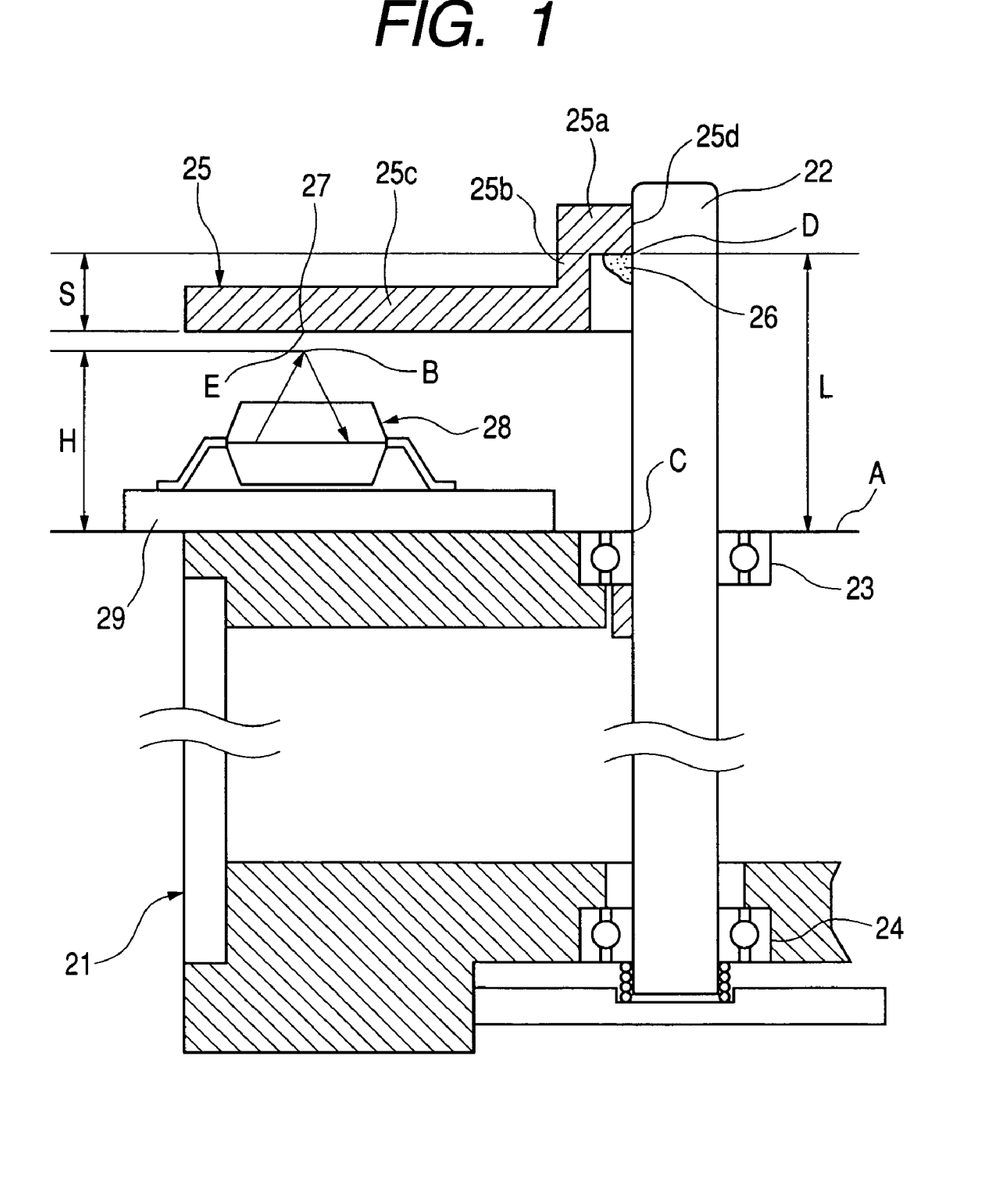
FIG. 1 is a cross sectional view showing the principal portion of a first embodiment.

FIG. 1 is a cross sectional view showing the principal part of a first embodiment of the present invention as a rotation angle detection apparatus in the form of a reflective rotary encoder. A rotary shaft 22 of a motor 21 is rotatably supported by an upper bearing 23 and a lower bearing 24. A rotary disk 25 is fitted to the upper portion of the rotary shaft 22. The rotary disk 25 is bonded to the rotary shaft 22 by adhesive 26. On the lower surface of the rotary disk 25, there is provided a rotation angle information record part 27, which includes one or more reflecting elements arranged regularly in the circumferential direction. The motor 21 has a reference mount surface A on which a reflection type sensor head 28 is attached with an electric circuit board 29 between.

The rotary disk 25 is made by integral molding using a light transmissive synthetic resin material. The rotary disk 25 is provided with a fixing portion 25a having a disk shape to be fixed to the rotary shaft 22, a cylindrical portion 25b extending downwardly from the outer periphery of the fixing portion 25a in the direction along the axis of the rotary shaft 22 (i.e. in the thrust direction) and a disk body portion 25c extending from the lower portion of the cylindrical portion 25b in the direction perpendicular to the rotary shaft 22 (i.e. in the radial direction). The fixing portion 25a has a fitting hole 25d formed therein into which the rotary shaft 22 is fitted. The rotation angle information record part 27 is provided on the lower surface of the disk body portion 25c.

It should be noted in the drawings that reference character B designates the light concentration (or focusing) point of the sensor head 28, reference character C designates the attaching point of the rotary shaft 22 and the inner ring of the upper bearing 23 in the plane of the reference mount surface A of the motor 21, reference character D designates the attaching point of the rotary shaft 22 and the rotary disk 25, reference character E designates an element point at which a reflecting element in the rotation angle information record part 27 is present, reference character L designates the distance in the thrust direction of the rotary shaft 22 between the attaching point C and the attaching point D, reference numeral H designates the distance in the thrust direction of the rotary shaft 22 between the reference mount surface A and the light concentration point B, and reference character S designates the distance in the thrust direction of the rotary shaft 22 between the attaching point D and the element point E.

Figure 2:
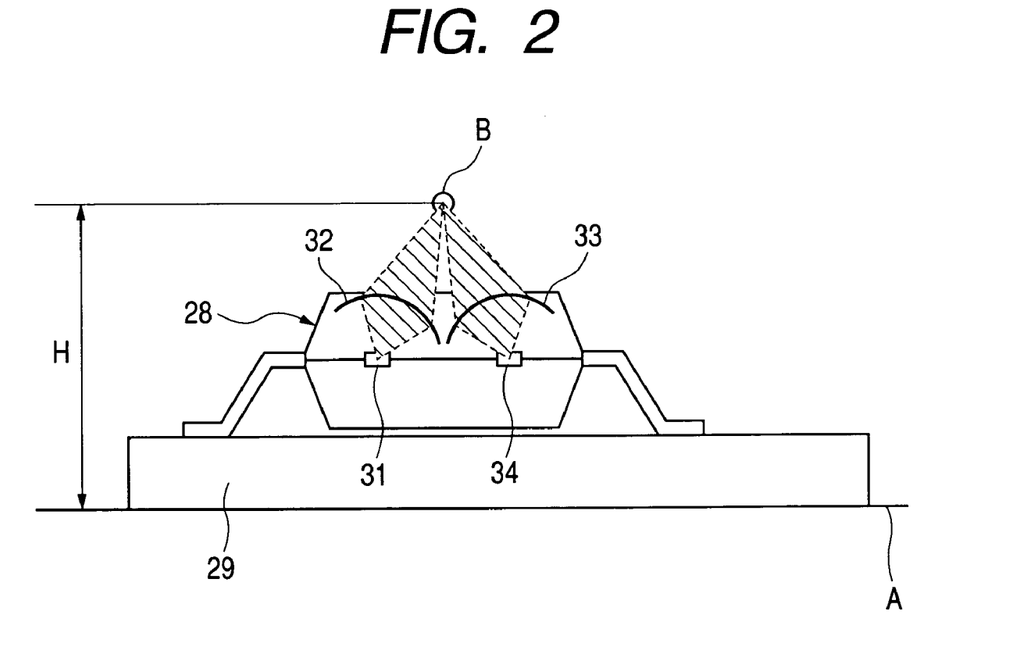
FIG. 2 is a drawing specifically illustrating a sensor head.

As shown in FIG. 2, the sensor head 28 is composed of a light emitting element 31 such as an LED for emitting light flux, a first collimator lens 32 for concentrating a light flux from the light emitting element 31 at the light concentration point B, a second collimator lens 33 for condensing a divergent light flux having been reflected by the rotation angle information record part 27 and a light receiving element 34 for detecting the a light flux from the second collimator lens 33.

In this rotary encoder, the light flux divergently emitted from the light emitting element 31 is transmitted by the first collimator lens so as to be transformed into a convergent light flux and concentrated at the light concentration point B. The light flux concentrated at the light concentration point B is reflected by the element point E of the rotation angle information record part 27 located at the light concentration point B so as to become a divergent light flux. The divergent light flux is then transmitted by the second collimator lens 33 so as to be transformed into a convergent light flux again and incident on the light receiving element 34. In the above described process, the light flux incident on the area of the rotation angle information record part 27 other than the element point(s) E is transmitted by the rotary disk. As the rotary disk 25 rotates, the reflecting element(s) of the rotation angle information record part 27 shifts in the circumferential direction and an electrical signal output from the light receiving element varies, so that rotation angle information is obtained.

When the light concentration point B and the position of the element point E coincide with each other, the sensor head outputs a good electrical signal. However, a rise in the ambient temperature due to heat generated by the motor 21 will cause thermal expansion of the rotary shaft 22, the rotary disk 25 and the sensor head 28. This tends to change the positions of the light concentration point B and the element point E. In view of this, the first embodiment is so designed that following equations (1) and (2) are met in order to prevent variations in the positions of the light concentration point B and the element point E:

$$\beta \times H \times \Delta T = (\alpha 2 \times L + \alpha 1 \times S) \times \Delta T \quad (1)$$

$$L = S + H \quad (2)$$

Where α1 represents the thermal expansion coefficient of the rotary disk 25, α2 represents the thermal expansion coefficient of the rotary shaft 22, β represents the thermal characteristic coefficient of the sensor head at its optimal position, and ΔT represents a change in temperature. As to the distances H and L, amounts above the reference mounting surface A are represented as positive values (i.e. plus +) while as to the distance S, amounts above the attaching point D are represented as positive values (+). It is assumed that the temperatures of the rotary shaft 22, rotary disk 25 and the sensor head 28 vary in substantially the same manner.

In addition, ΔH represents a change in the distance H, which varies with a change ΔT in temperature, and the temperature characteristic coefficient β is defined as β=ΔH/H. This means that the temperature characteristic coefficient β is a coefficient that quantitatively represents at what rate the distance H varies with a change in temperature.

Figure 3:
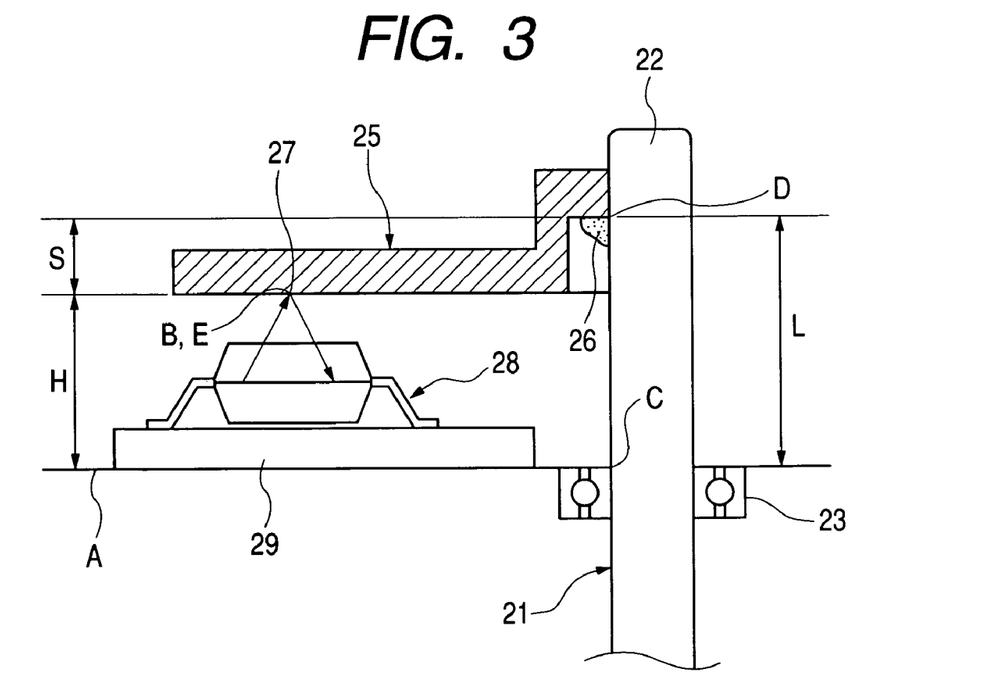
FIG. 3 is a drawing illustrating a state in which a light concentration point and an element point coincide with each other.

FIG. 3 shows a state in which the ambient temperature is the ordinary temperature 20° C. and the light concentration point B and the element point E coincide with each other, which means that the rotary disk 25 is fixed to the rotary shaft 22 in the optimum positional relationship. At the time of manufacturing the rotary encoder, the thermal expansion coefficients α1 and α2 and the temperature characteristic coefficient β are known. In addition, the position of the light concentration point B can be determined in advance as a result of mounting of the sensor head 28. This means that the distance H can also be determined in advance. Therefore, the distance L and the distance S are determined by substituting the respective values for the thermal expansion coefficients α1 and α2, the temperature characteristic coefficient β and the distance H in equation (1) and solving equations (1) and (2) as simultaneous equations. With the obtained distances L and S, the shapes and the fixing positions of the rotary shaft 22, the rotary disk 25 and the sensor head 28 are determined.

Figure 4:
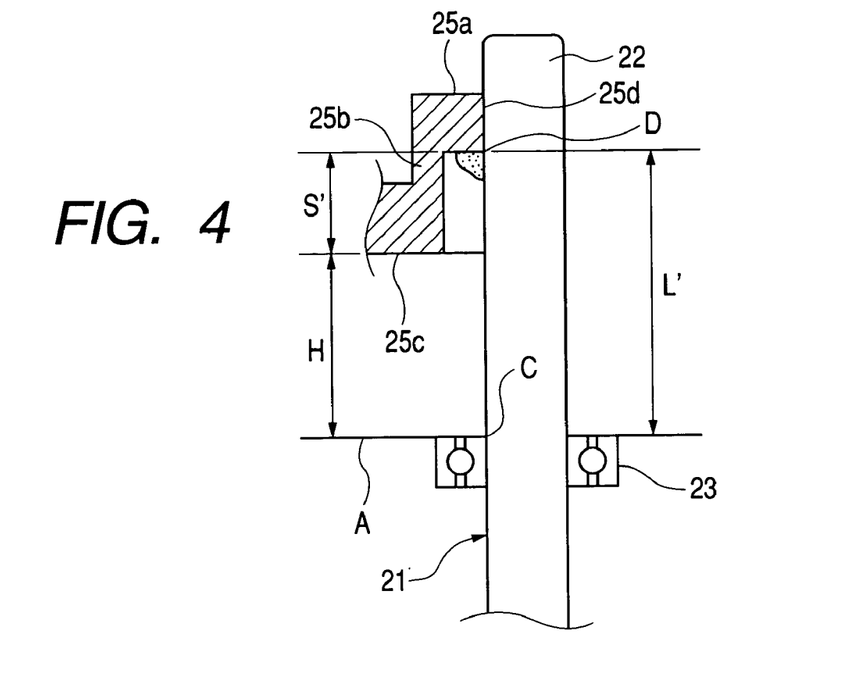
FIG. 4 is a drawing for illustrating an effect in a state in which temperature has risen.

FIG. 4 is a drawing for illustrating an effect of the above-described arrangement, which shows a case in which the temperature characteristic coefficient β=0 and the ambient temperature has greatly changed. In addition, it is assumed that the rotary shaft 22 is made of a stainless steel and the rotary disk 25 is made of a polycorbonate, and therefore the thermal expansion coefficient α1 is nearly equal to $6.6 \times 10^{-5}$ and the thermal expansion coefficient α2 is nearly equal to $1.47 \times 10^{-5}$. If it is assumed that the distance H is 7.7 mm, it is determined that the distance L is +9.9 mm and the distance S is −2.2 mm.

In this case, since it is assumed that the temperature characteristic coefficient β is equal to 0 (zero), the sensor head is not influenced by temperature, and therefore the position of the light concentration point B will not change. However, since the ambient temperature greatly increases, the rotary shaft 22 and the rotary disk 25 are expanded thermally in accordance with their proper thermal expansion coefficients α1 and α2. When the rotary shaft 22 is thermally expanded, the attaching point D shifts upwardly, so that the distance L is enlarged to distance L'. In addition, the rotary disk expands in the downward direction with the fixing point D being the reference, so that the distance S is enlarged to distance S'. In these process, the cylindrical portion 25b of the rotary disk 25 expands mainly in the downward direction to cancel a shift of the element point E in the thrust direction caused by the expansion of the rotary shaft 22.

Therefore, in the first embodiment, even if the ambient temperature greatly increases, both of the light concentration point B and the element point E remains as fixed points, and so it is possible to output a stable signal.

Figure 5:
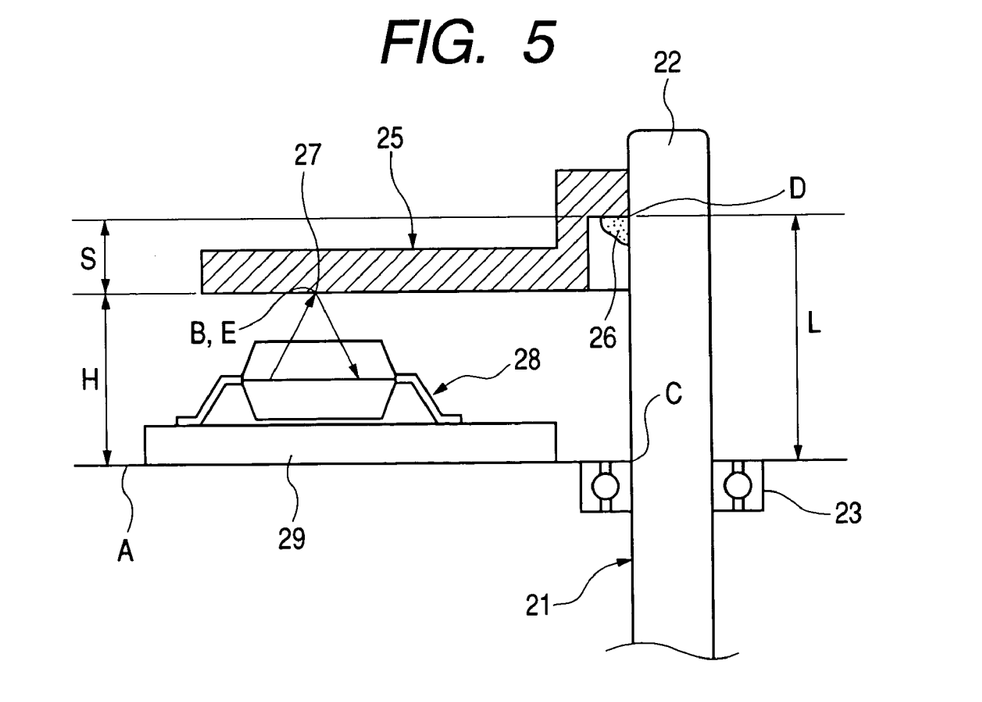
FIG. 5 is a cross sectional view showing the principal portion of a second embodiment.
Figure 6:
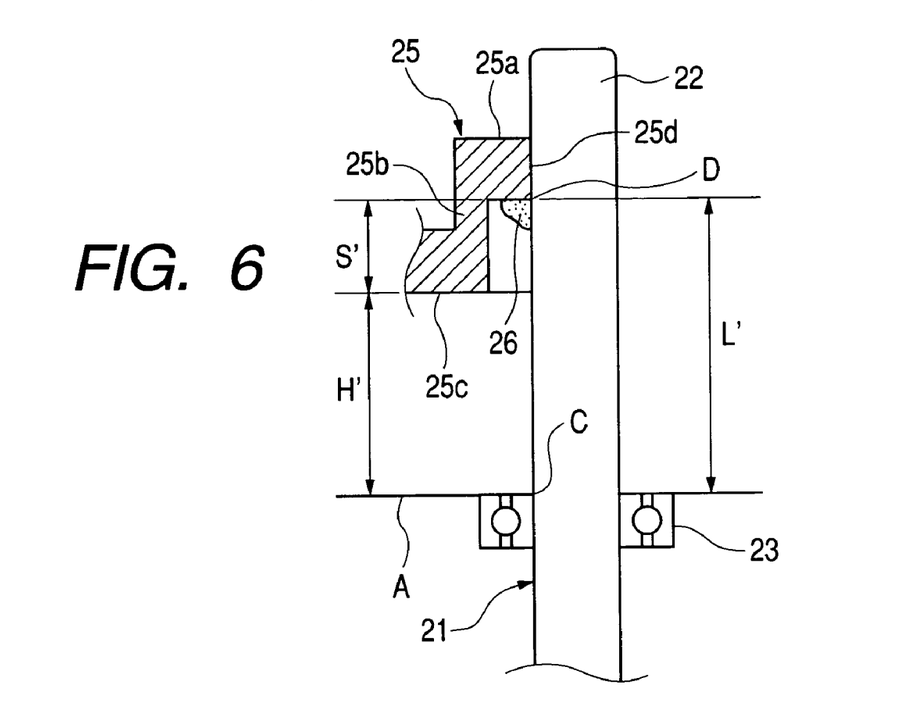
FIG. 6 is a drawing for illustrating an effect in a state in which temperature has risen.

FIG. 5 is a cross sectional view showing the principal part of an apparatus according to a second embodiment. FIG. 5 is a drawing for illustrating an effect of that apparatus, in which it is assumed that the temperature characteristic coefficient β=$0.50 \times 10^{-5}$ and the other conditions are the same as the above-described conditions. In this second embodiment, it is determined that the distance L is +9.15 mm and the distance S is −1.45 mm, and the effect same as that of the first embodiment can be attained.

Figure 7:
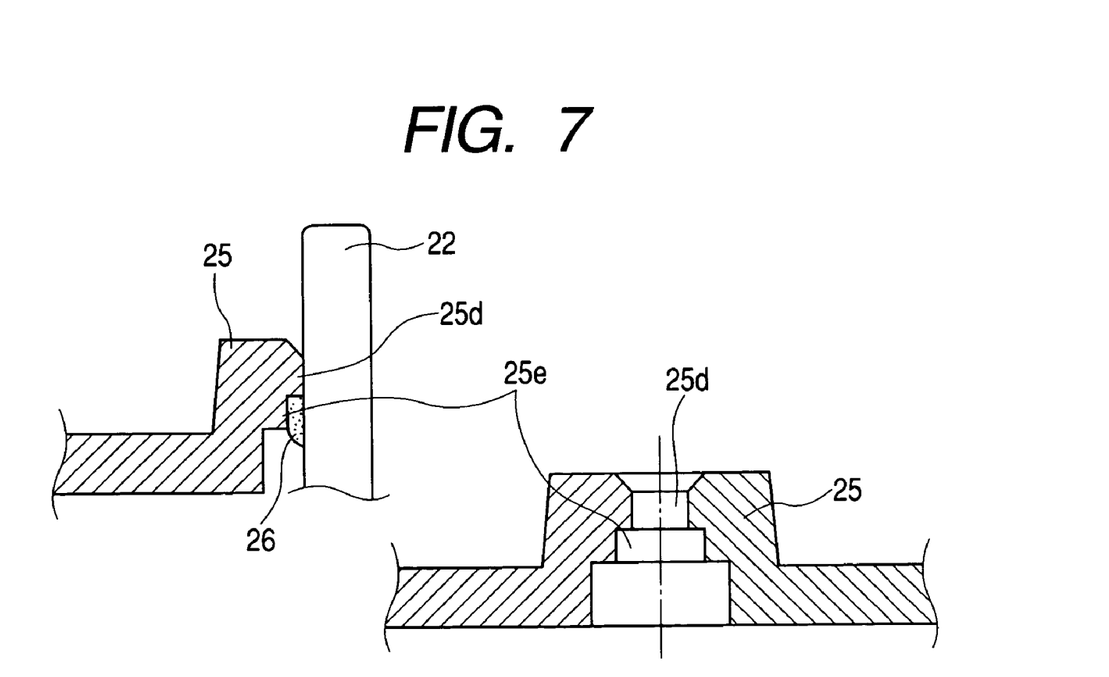
FIG. 7 is a cross sectional view showing the principal portion of a third embodiment.

FIG. 7 is directed to a third embodiment of the present invention, and showing a way of mounting a rotary disk 25 to a rotary shaft 22 and the shape of the rotary disk which are different from those in the first and second embodiments.

The rotary disk 25 is integrally formed using a metal mold for injection molding to have a rotation information record part, a first fitting portion 25d having a first fitting dimension and a second fitting portion 25e having a second fitting dimension. The rotary disk is formed in such a way that the coaxiality of the center of a pattern of the rotation position information record part in the rotary disk and the first fitting portion 25d is assured at especially high precision, so that it is fitted to the rotary shaft 22 with high precision.

In order to assure accuracy in the coaxiality at the fitting portion, it is necessary to reduce clearance at the fitting portion as small as possible. In that case, when an adhesive or the like is used as bonding means, it becomes difficult to infuse the adhesive into the clearance between the rotary shaft 22 and the fitting surface 25d. In view of this, the second fitting portion 25e having the second fitting dimension different from that of the first fitting portion 25d is formed to provide an appropriate clearance, in which a required amount of adhesive can be infused. Thus, the bonding strength between the rotary disk 25 and the rotary shaft 22 can be obtained.

Figure 8:
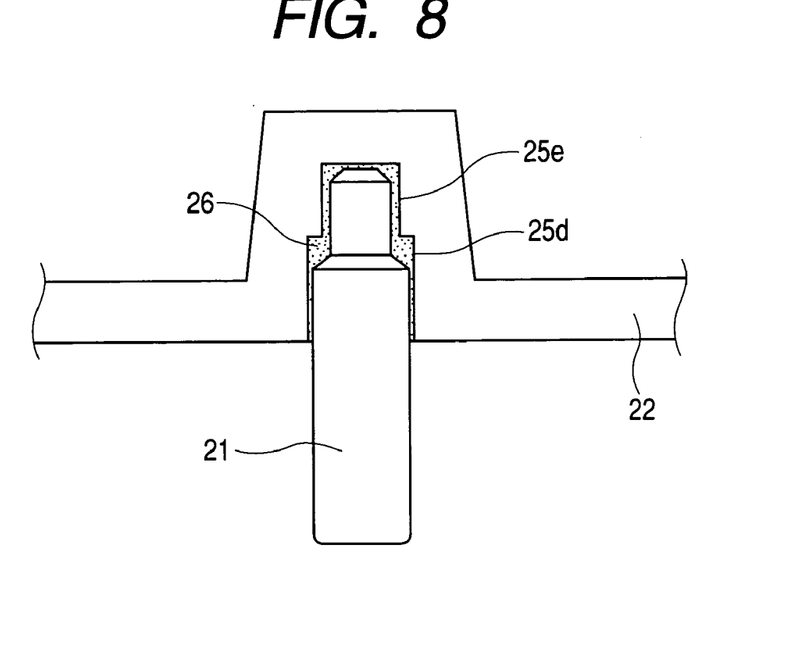
FIG. 8 is a cross sectional view showing the principal portion of a fourth embodiment.

FIG. 8 is directed to a third embodiment of the present invention, and showing, similar to FIG. 7, a way of mounting a rotary disk 25 to a rotary shaft 22 and the shape of the rotary disk which are different from those in the first and second embodiments. The rotary disk 25 is integrally formed using a metal mold for injection molding to have a rotation information record part, a first fitting portion 25d having a first fitting dimension and a second fitting portion 25e having a second fitting dimension, in a similar fashion as in the third embodiment. The rotary disk is formed in such a way that the coaxiality of the center of a pattern of the rotation position information record part in the rotary disk and the first fitting portion 25d is assured at especially high precision, so that it is fitted to the rotary shaft with high precision.

The rotary disk in this embodiment is of a concave shape having a bottom, and it is easy to provide a gate for a resin material on the concave portion having a bottom. In other words, it is possible to provide the gate at the center of the pattern. Therefore, flow of the resin will be in point symmetrical with respect to the pattern, and therefore it is possible to enhance precision of the pattern.

Figure 9:
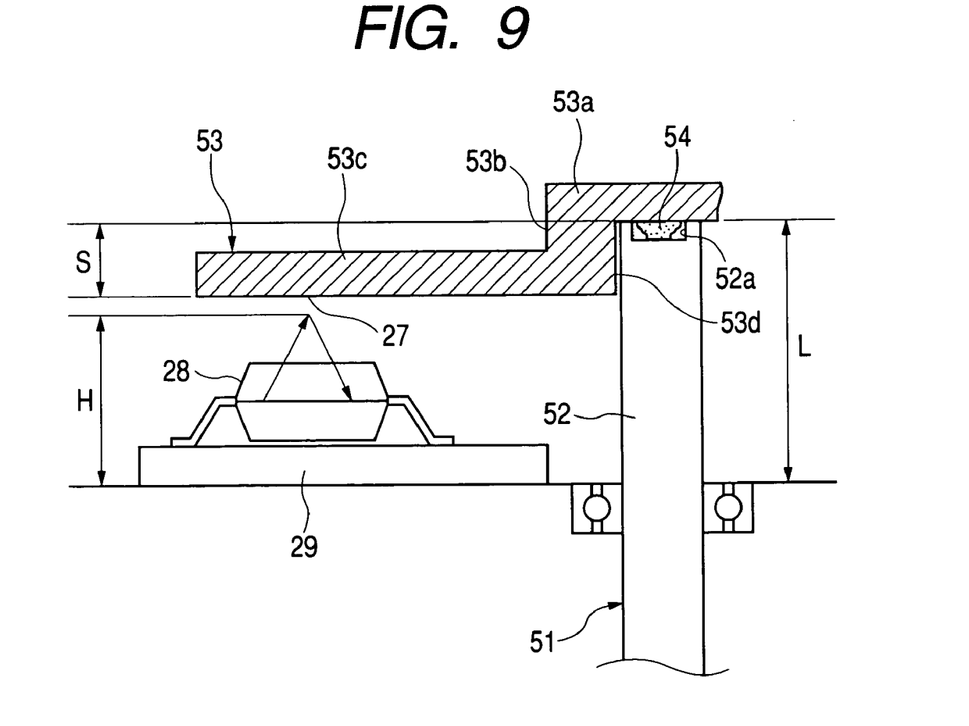
FIG. 9 is a cross sectional view showing the principal portion of a fifth embodiment.

FIG. 9 is a cross sectional view showing the principal portion of the apparatus according to a fifth embodiment of the present invention. In this apparatus, a rotary disk 53 is attached to the top surface of a rotary shaft 52 of a motor 51 by adhesive 54. On the top surface of the rotary shaft 52, there is provided a groove 52a in which the adhesive 54 is applied.

The rotary disk 53 is provided with a fixing portion 53a to be placed on the top surface of the rotary shaft 52, a cylindrical portion 53b extending downwardly from the outer periphery of the fixing portion 53a and a disk body portion 53c extending horizontally and outwardly from the lower portion of the cylindrical portion 53b. The interior of the cylindrical portion 53b is formed as a fitting hole 53d into which the rotary shaft 52 is fitted in such a way that a small clearance would remain between the outer circumferential surface of the rotary shaft 52 and the inner circumferential surface of the fitting hole 53d. A rotation angle information record part 27 is provided on the lower surface of the disk body portion 53c. This fifth embodiment also attain the effect same as that of the first to third embodiments.

Figure 10:
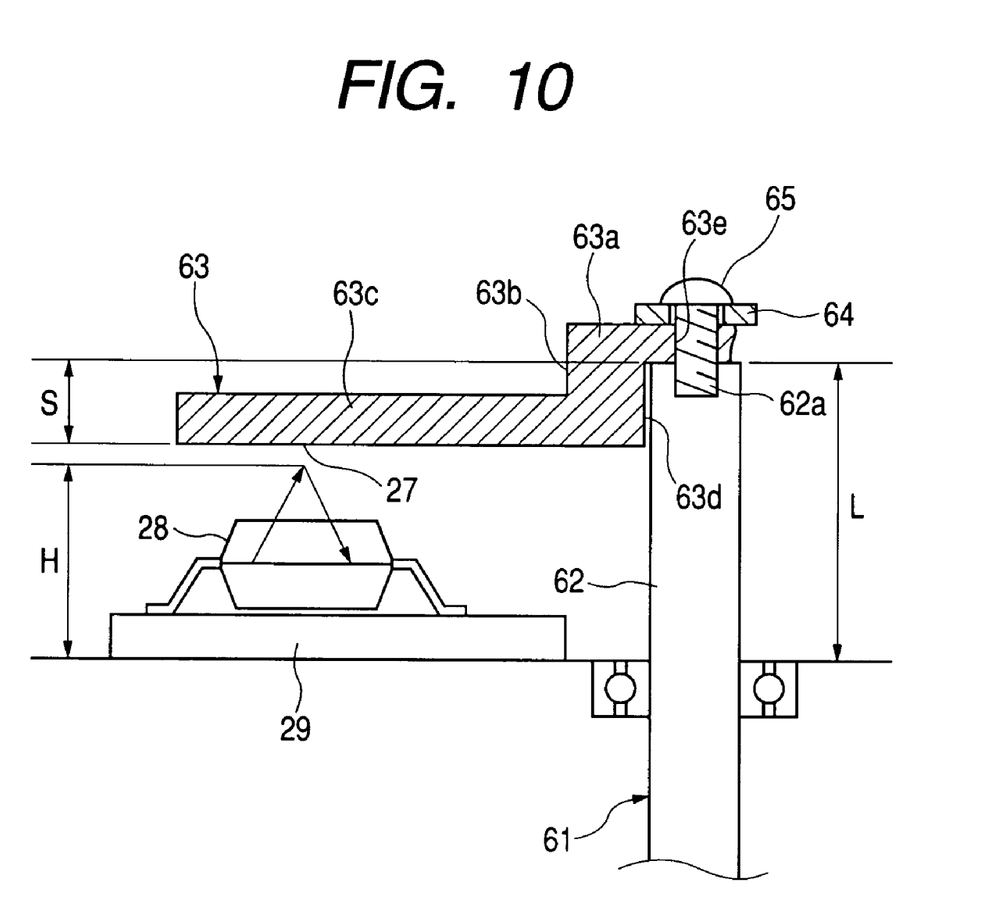
FIG. 10 is a cross sectional view showing the principal portion of a sixth embodiment.

FIG. 10 is a cross sectional view showing the principal portion of an apparatus according to a sixth embodiment of the present invention. In this apparatus, a rotary disk 63 is attached to the top surface of a rotary shaft 62 of a motor 61 by a washer 64 and a set screw 65. On the top surface of the rotary shaft 62, there is formed a screw hole 62a into which the set screw 65 is to be threaded.

The rotary disk 63 is provided with a disk-like fixing portion 63a to be fixed to the top surface of the rotary shaft 62, a cylindrical portion 63b extending downwardly from the outer periphery of the fixing portion 63a and a disk body portion 63c extending horizontally and outwardly from the lower portion of the cylindrical portion 63b. The interior of the cylindrical portion 63b is formed as a fitting hole 63d into which the rotary shaft 62 is fitted in such a way that a small clearance would remain between the outer circumferential surface of the rotary shaft 62 and the inner circumferential surface of the fitting hole 63d. An insert hole 63e through which the set screw 65 is to be inserted is formed on the fixing portion 63a. A rotation angle information record part 27 is provided on the lower surface of the disk body portion 63c. This sixth embodiment also attain the effect same as that of the first to third embodiments.

As has been described in the foregoing, in the rotation angle detection apparatus according to the present invention, the relative position of a rotation angle information record part and a sensor head are determined based on the thermal expansion coefficient of a rotary disk, the thermal expansion coefficient of a rotary shaft and the temperature characteristic coefficient of the sensor head, so that the optimum relative position of the rotation angle information record part and the sensor head can be maintained, even if the ambient temperature varies. Therefore, it is possible to stabilize-an output signal to reduce detection error while enhancing bonding strength of the rotary shaft and the rotary shaft. In addition, it is possible to enlarge the usable temperature range and to realize rotation angle detection with high resolution and high accuracy.

The rotary disk for a rotation angle detection apparatus according to the present invention is made of a synthetic resin material and provided with a fixing portion to be fixed to a rotary shaft of a motor of the rotation angle detection apparatus, a cylindrical portion extending from the outer peripheral portion of the fixing portion in the direction along the axis of the rotary shaft and a disk body portion extending from an end portion of the cylindrical portion in the direction perpendicular to the axis of the rotary shaft. Therefore, when the ambient temperature rises, the cylindrical portion mainly expands in the direction along the axis so that expansion of the rotary shaft along the axis can be canceled.

In addition, with the provision of a first fitting portion that would create minimized clearance between the rotary shaft and the rotary disk in order to enhance their coaxiality and a second fitting portion used for bonding or fixing the rotary disk to the rotary shaft, it is possible to maintain a positional relationship between the sensor head and the rotary disk stable against variations in temperature while maintaining a high degree of coaxiality.

The invention claimed is:

1. A rotation angle detection apparatus comprising:
   a rotary shaft;
   a rotary disk that is made of a synthetic resin material, fixed to said rotary shaft and having a rotation angle information record part; and
   a sensor portion that detects information from said rotation angle information record part;
   wherein said rotary disk is attached to said rotary shaft in such a way that a direction of shift of said rotation angle information record part of said rotary disk in the thrust direction caused by variation in temperature and a direction of shift of said rotary shaft in the thrust direction caused by variation in temperature would cancel each other.

2. A rotation angle detection apparatus according to claim 1, wherein said rotary disk is provided with:
   a fixing portion to be fixed to said rotary shaft;
   a cylindrical portion extending from an outer peripheral portion of the fixing portion in a direction along an axis of said rotary shaft; and a disk body portion extending from an end portion of the cylindrical portion in a direction perpendicular to the axis of said rotary shaft;
   wherein said rotation angle information record part is disposed on said disk body portion.

* * * * *